(12) United States Patent
Kato

(10) Patent No.: US 11,121,554 B2
(45) Date of Patent: Sep. 14, 2021

(54) ELECTRICAL POWER CONTROL APPARATUS, ELECTRICAL POWER CONTROL METHOD AND ELECTRICAL POWER CONTROL SYSTEM

(71) Applicant: NEC Platforms, Ltd, Kawasaki (JP)

(72) Inventor: Keisuke Kato, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 947 days.

(21) Appl. No.: 15/709,821

(22) Filed: Sep. 20, 2017

(65) Prior Publication Data
US 2018/0097364 A1 Apr. 5, 2018

(30) Foreign Application Priority Data
Sep. 30, 2016 (JP) .............................. JP2016-192789

(51) Int. Cl.
*H02J 3/32* (2006.01)
*H02J 7/00* (2006.01)
*H02J 7/35* (2006.01)

(52) U.S. Cl.
CPC .............. *H02J 3/32* (2013.01); *H02J 7/0013* (2013.01); *H02J 7/0014* (2013.01); *H02J 7/0021* (2013.01); *H02J 7/35* (2013.01)

(58) Field of Classification Search
CPC .......... H02J 3/32; H02J 7/0013; H02J 7/0014; H02J 7/0021; H02J 7/35; H02J 9/04; H02J 3/46
USPC ...................... 307/72, 52, 80; 320/118, 134
See application file for complete search history.

(56) References Cited

U.S. PATENT DOCUMENTS

| 6,291,973 | B1* | 9/2001 | Lee ....................... | H02J 7/0069 320/128 |
|---|---|---|---|---|
| 2001/0013767 | A1 | 8/2001 | Takemoto | |
| 2002/0023235 | A1 | 2/2002 | Odaohhara | |
| 2012/0169291 | A1 | 7/2012 | Abe et al. | |
| 2013/0258830 | A1 | 10/2013 | Yoda | |
| 2015/0035494 | A1* | 2/2015 | Suzuki ................... | H02J 7/0014 320/134 |
| 2015/0057827 | A1* | 2/2015 | Uchikawa ................ | G05F 1/66 700/297 |
| 2015/0180232 | A1* | 6/2015 | Mino ....................... | H02J 1/102 307/23 |

(Continued)

FOREIGN PATENT DOCUMENTS

| JP | 2001-231175 A | 8/2001 |
|---|---|---|
| JP | 2002-062952 A | 2/2002 |

(Continued)

OTHER PUBLICATIONS

Japanese Office Action for JP Application No. 2016-192789 dated Feb. 12, 2019 with English Translation.

(Continued)

*Primary Examiner* — Toan T Vu

(57) ABSTRACT

An electrical power control apparatus controls electrical power supply from an electrical power source unit and a battery unit to a target of supply. The electrical power control apparatus includes a supply control circuit. The supply control circuit supplies electrical power of the battery unit in preference to electrical power of the electric power source unit to the target of supply when an amount of charge of the battery unit is equal to or higher than a threshold.

10 Claims, 11 Drawing Sheets

(56) References Cited

U.S. PATENT DOCUMENTS

| | | | |
|---|---|---|---|
| 2016/0099607 A1* | 4/2016 | Landis | H02J 3/30 307/46 |
| 2016/0226268 A1 | 8/2016 | Okui | |
| 2017/0324246 A1* | 11/2017 | Sato | H02J 3/382 |
| 2018/0331397 A1* | 11/2018 | Yamaai | H02J 7/34 |

FOREIGN PATENT DOCUMENTS

| | | | |
|---|---|---|---|
| JP | 2003-217534 A | 7/2003 | |
| JP | 2007-312499 A | 11/2007 | |
| JP | 2009-240078 A | 10/2009 | |
| JP | 2009-247107 A | 10/2009 | |
| JP | 2011-176980 A | 9/2011 | |
| JP | 2012-044733 A | 3/2012 | |
| JP | 2013-172477 A | 9/2013 | |
| JP | 2013-207844 A | 10/2013 | |
| JP | 2014-241692 A | 12/2014 | |
| JP | 2016-149833 A | 8/2016 | |
| WO | 2011/043172 A1 | 4/2011 | |

OTHER PUBLICATIONS

Japanese Office Action for JP Application No. 2016-192789 dated Aug. 20, 2019 with English Translation.

* cited by examiner

|  | PERCENTAGE OF CHARGE |
|---|---|
| FIRST THRESHOLD | 8 0 % |
| SECOND THRESHOLD | 2 0 % |

Fig.10

|           | PERCENTAGE OF CHARGE |
|-----------|----------------------|
| SETTING 1 | 1 0 0 %              |
| SETTING 2 | 5 0 %                |
| SETTING 3 | 1 0 %                | ized
ELECTRICAL POWER CONTROL APPARATUS, ELECTRICAL POWER CONTROL METHOD AND ELECTRICAL POWER CONTROL SYSTEM This application is based upon and claims the benefit of priority from Japanese Patent Application No. 2016-192789, filed on Sep. 30, 2016, the disclosure of which is incorporated herein in its entirety by reference.

TECHNICAL FIELD

The present invention relates to an art for a system which supplies electrical power to a target of supply using an electrical power source device and a battery.

BACKGROUND ART

A power supply system is provided for stably supplying electrical power from an electrical power source device or a battery to a certain device.

For example, literature 1 (JP2011-176980A) discloses a configuration of a system supplying electrical power to a disk array device. This system includes a main electrical power source device, a spare electrical power source device, an auxiliary electrical power source device and a disk array device. In this system, the auxiliary electrical power source device has a condenser with large capacity. The condenser is charged with a surplus of electric power from the main electrical power source device. Further, when an abnormality of the main electrical power source device is occurred, the auxiliary electrical power source device supplements a reduced output power from the main electrical power source device, to keep the main electrical power source device in an operational condition of excellent electrical power conversion efficiency for supplying electrical power to the disk array device.

Literature 2 (JP2013-172477A) discloses the configuration of a system including an electrical power generation unit and an electrical power storage unit. In this system, the electrical power storage unit supplies electrical power to the electrical power generation unit while any commercial electrical power source does not supply electrical power to the electrical power generation unit. This allows the system to benefit from the performance fully exhibited by the electrical power generation unit and to supply electrical power from the electrical power generation unit to a load, even when no electrical power is supplied from the commercial electrical power source.

Literature 3 (JP2013-207844A) discloses a configuration which supplies electrical power to a destination of electric power supply even when a main electric power source is shut down. In other words, this configuration includes a path-switching circuit which switches paths for electrical power supply such that electrical power is supplied from multiple secondary batteries to the destination of electric power upon the shutdown of the main electric power source.

Literature 4 (JP2012-044733A) discloses a configuration of an electrical power supply system including a solar battery. This system includes the solar battery and a storage battery. The system charges the storage battery using electrical power from a commercial power supply network during a time zone of midnight electrical power, and in the daytime, supplies electrical power from the output by an inverter for the storage battery and from the output of electrical power generated by the solar battery to a load, thereby enabling reducing electrical power supply from the commercial electrical power source to the load.

Literature 5 (JP2003-217534A) discloses a configuration relevant to an electrical power supply using multiple unit battery cells. In this configuration, the multiple unit battery cells are connected in series and electrical power from the multiple unit battery cells connected in series is supplied to a load. In addition, when each of the unit battery cells is charged, it is connected to its charging circuit and charged up to its optimum condition.

SUMMARY

Literature 1 to 3 merely disclose configurations that use a battery to complement the shortage of electrical power upon the abnormality of commercial electrical power sources. Literature 4 merely discloses that the charge/discharge of the storage battery is switched depending on time zones. Literature 5 merely discloses a charging method of multiple storage batteries.

In other words, Literature 1 to 5 merely disclose the use of a battery upon the abnormality of the sources and the control of the battery depending on time zones, not disclosing any configuration using an electrical power source unit efficiently.

A main object of the present invention is to provide an art to use efficiently an electrical power source unit.

An electrical power control apparatus according to an example aspect of the present invention, which controls electrical power supply from an electrical power source unit and a battery unit to a target of supply, includes a supply control circuit that, when an amount of charge of the battery unit is equal to or higher than a threshold, supplies electrical power of the battery unit in preference to electrical power of the electric power source unit to the target of supply.

An electrical power control system according to an example aspect of the present invention, includes:

an electrical power source unit;

a battery unit that receives electrical power from the electric power source unit and charges the electrical power;

a supply control circuit that controls electrical power supply from one or both of the electric power source unit and the battery unit to a target of supply; and a power source management circuit that controls the electrical power supply from the electric power source unit, wherein when an amount of charge of the battery unit is equal to or higher than a threshold, the supply control circuit supplies electrical power of the battery unit in preference to electrical power of the electric power source unit to the target of supply.

An electrical power control method according to an example aspect of the present invention for controlling electrical power supply from an electrical power source unit and a battery unit to a target of supply, includes supplying electrical power of the battery unit in preference to electrical power of the electric power source unit to the target of supply when an amount of charge of the battery unit is equal to or higher than a threshold.

BRIEF DESCRIPTION OF THE DRAWINGS

Exemplary features and advantages of the present invention will become apparent from the following detailed description when taken with the accompanying drawings in which:

FIG. 10 is a table illustrating one example of information on setting for battery charge in the third example embodiment;

EXAMPLE EMBODIMENTS

First Example Embodiment

Figure 1:
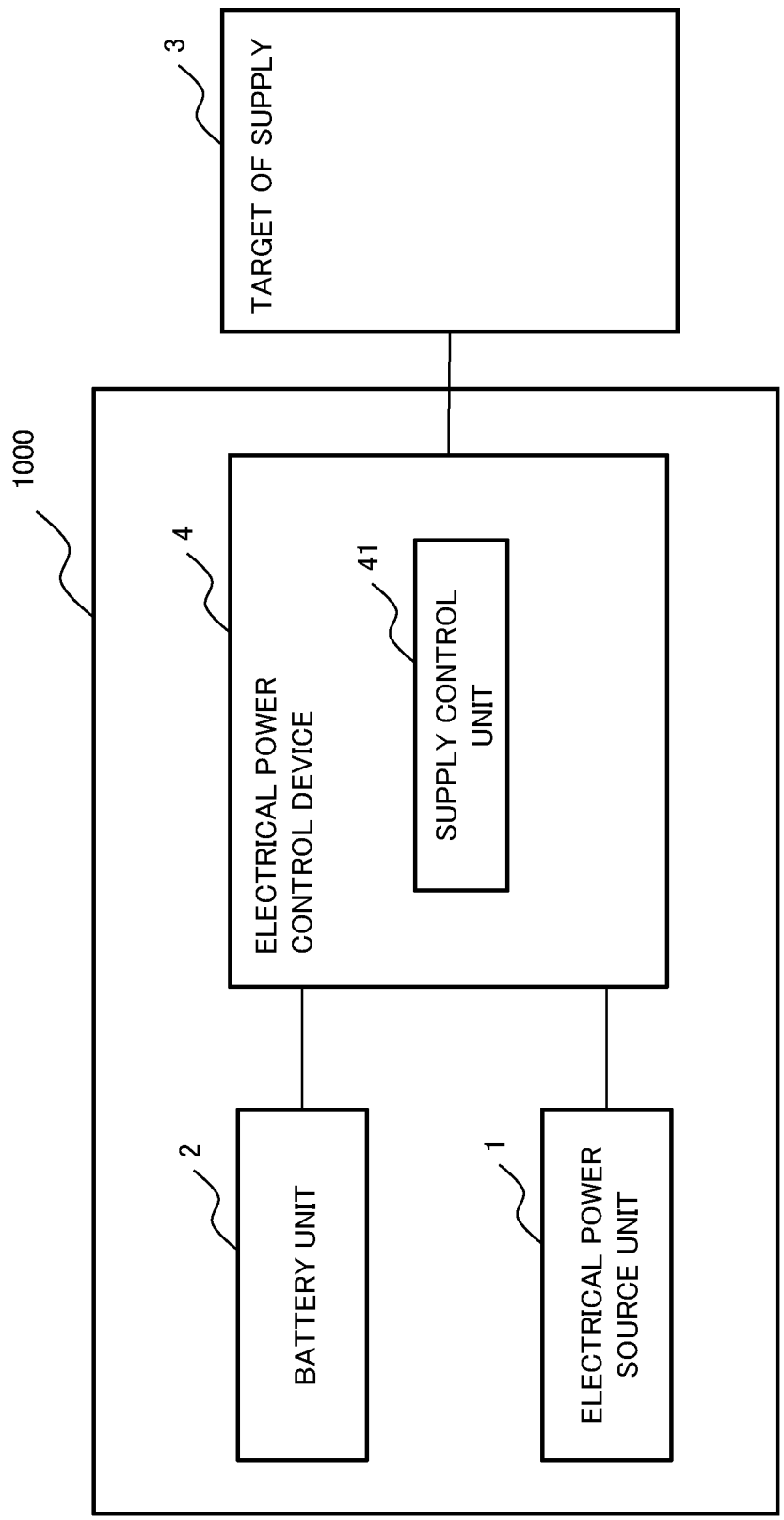
FIG. 1 is a block diagram illustrating a configuration of an electrical power control system in first example embodiment according to the present invention.

First example embodiment according to the present invention will be described. First, a configuration of the first example embodiment will be described. FIG. 1 is a block diagram illustrating the configuration of an electrical power control system in the first example embodiment.

With reference to FIG. 1, the electrical power control system 1000 is a system that includes an electrical power source unit 1, a battery unit 2 and an electrical power control apparatus 4, and supplies electrical power to a target of supply 3.

The electrical power source unit 1 includes a circuit configuration that converts Alternating Current (AC) voltage of electrical power supplied from a commercial electrical power source to Direct Current (DC) voltage and outputs the converted electrical power.

The battery unit 2 includes a configuration which is supplied with electrical power from the electrical power source unit 1 via the electrical power control apparatus 4 and which charges the electrical power. For example, the battery unit 2 includes multiple storage batteries.

The electrical power control apparatus 4 includes a supply control unit 41. The supply control unit 41 is a circuit having a function of controlling a path through which electrical power is supplied from one or both of the electrical power source unit 1 and the battery unit 2 to the target of supply 3 and controlling an amount of the electrical power supplying to the target of supply 3. For example, when the amount of charge of the battery unit 2 is equal to or higher than a threshold, the supply control unit 41 supplies the electrical power of the battery unit 2 in preference to the electrical power of the electrical power source unit 1 to the target of supply 3. The target of supply 3 is an apparatus that receives electrical power and operates using the received electrical power. Further, the control function of the supply control unit 41 is implemented using a apparatus such as a microprocessor and a hardware processor.

Figure 2:
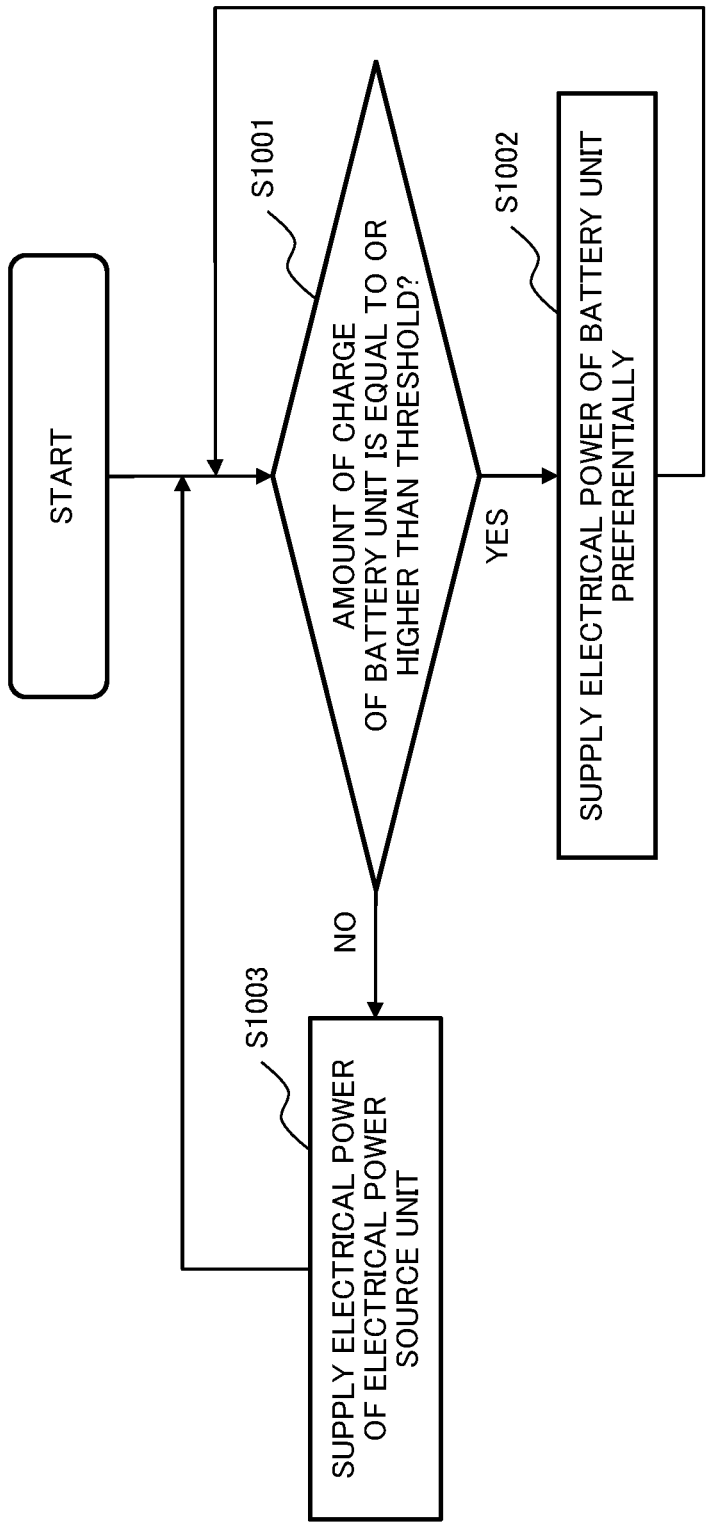
FIG. 2 is a flowchart illustrating an operation of the electrical power control system in the first example embodiment.

Next, an operation of the electrical power control system 1000 in the first example embodiment will be described with reference to FIG. 2. FIG. 2 is a flowchart illustrating the operation of the electrical power control system 1000 in the first example embodiment.

First, the battery unit 2 determines whether the amount of charge of itself is equal to or higher than the threshold (step S1001). The threshold is, for example, an amount of electrical power necessary to make the target of supply 3 operate during a predetermined time.

When the battery unit 2 determines that the amount of charge of itself is equal to or higher than the threshold (step S1001: YES), the supply control unit 41 supplies the electrical power of the battery unit 2 in preference to the electrical power of the electrical power source unit 1 to the target of supply 3 (step S1002). For example, the supply control unit 41 controls a path for supplying electrical power to the target of supply 3, and by the control of the path, the electrical power from the battery unit 2 is supplied to the target of supply 3 and the electrical supplied power from the electrical power source unit 1 to the target of supply 3 stops. Alternatively, the supply control unit 41 controls the amount of the electrical power supplied from the electrical power source unit 1 and from the battery unit 2 to the target of supply 3, and by the control of the amount of the electrical power, the amount of the electrical power supplied from the battery unit 2 to the target of supply 3 becomes larger than the electrical power supplied from the electrical power source unit 1 to the target of supply 3.

Then, after a predetermined elapsed time, the electrical power control system 1000 repeats the operation of the step S1001 or later.

On the other hand, when the battery unit 2 determines that the amount of charge of the battery unit 2 is lower than the threshold (step S1001: NO), the supply control unit 41 controls the path for supplying the electrical power to the target of supply 3, and by the control of the path, the electrical power is supplied from the electrical power source unit 1 to the target of supply 3 (step S1003). Then, after a predetermined elapsed time, the electrical power control system 1000 repeats the operation of the step S1001 or later.

The supply control unit 41 may determine whether the amount of charge of the battery unit 2 is equal to or higher than the threshold. For example, the supply control unit 41 may obtain information on the amount of charge of the battery unit 2 and determine whether the amount of charge of itself is equal to or higher than the threshold. Further, the battery unit 2 may be configured to supply the electrical power to the electrical power control apparatus 4 when the amount of charge of the battery unit 2 is equal to or higher than the threshold. In this case, the supply control unit 41 may determine whether the electrical power is supplied from the battery unit 2 to the electrical power control apparatus 4 in order to determine whether the amount of charge of the battery unit 2 is equal to or higher than the threshold. In other words, the supply control unit 41 determines that the amount of charge of the battery unit 2 is equal to or higher than the threshold when the electrical power is supplied from the battery unit 2 to the electrical power control apparatus 4. Further, the supply control unit 41 determines that the amount of charge of the battery unit 2 is lower than the threshold when the electrical power is not supplied from the battery unit 2 to the electrical power control apparatus 4.

The electrical power control system 1000 in the first example embodiment operates as described above.

The electrical power control system 1000 in the first example embodiment can run the electrical power source unit 1 in an efficient condition. The reason is that when the amount of charge of the battery unit 2 is equal to or higher than the threshold, the supply control unit 41 supplies the electrical power of the battery unit 2 in preference to the electrical power of the electrical power source unit 1 to the target of supply 3.

In other words, the electrical power source unit 1 exhibits a variation in electrical power conversion efficiency owing to a variation in a load, meanwhile the battery unit 2 exhibits a smaller variation in the power conversion efficiency owing to the variation in the load than the electrical power source unit 1. The use of the electrical power of the battery unit 2 enables the electrical power control system 1000 to reduce the duration of supplying electrical power from the electrical power source unit 1 to the target of supply 3 and the supplied amount thereof. The electrical power control system 1000 uses the electrical power of the battery unit 2 which exhibits the small variation in the electrical power conversion efficiency caused by the variation in the load, in preference to the electrical power of the electrical power source unit 1, and thereby can reduce not only the influence of the load variation of the target of supply 3 on the electrical power source unit 1, but also electrical power loss caused by the deterioration of the electrical power conversion efficiency of the electrical power source unit 1.

Second Example Embodiment

Figure 3:
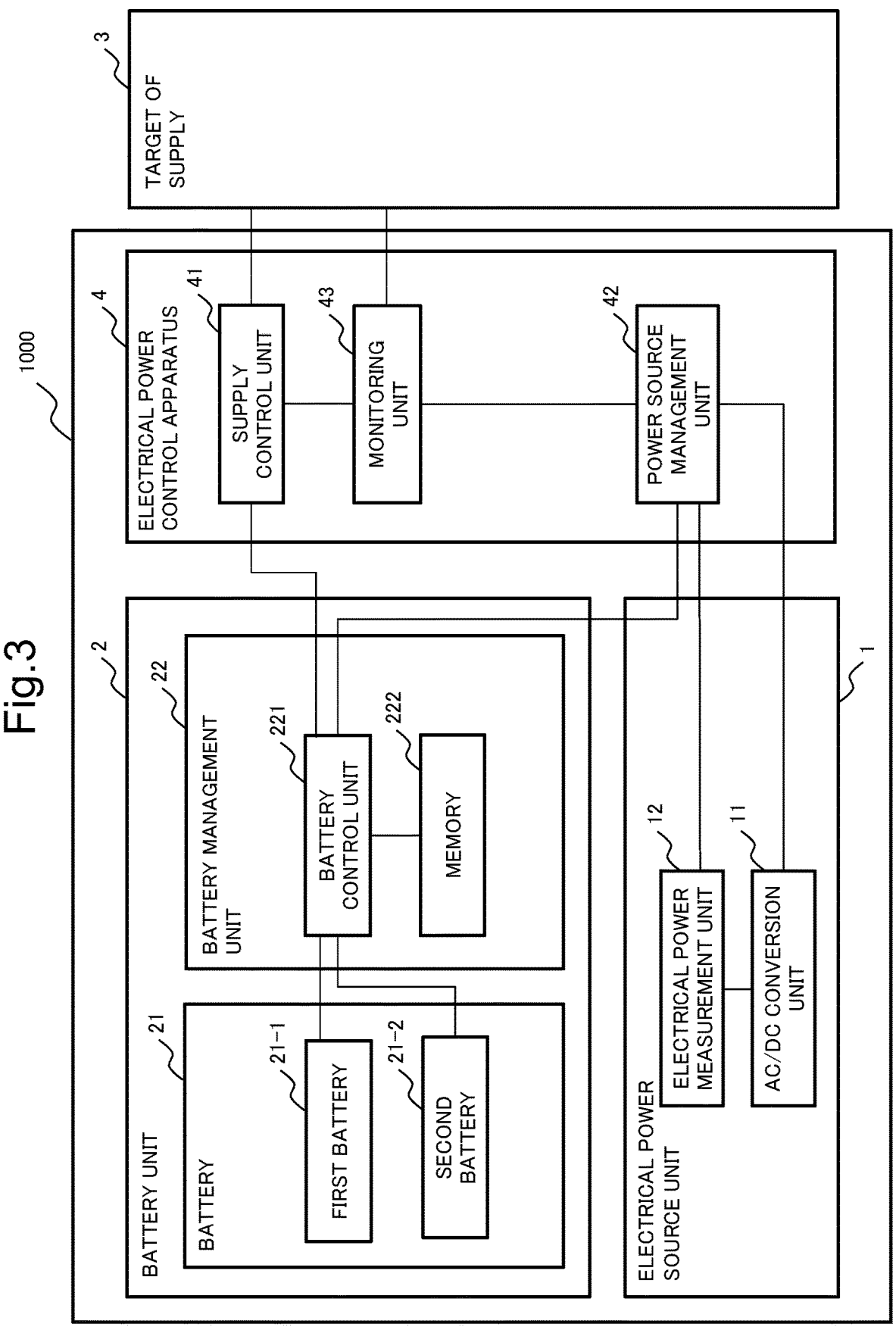
FIG. 3 is a block diagram illustrating a configuration of an electrical power control system in second example embodiment according to the present invention.

Next, second example embodiment according to present invention will be described. First, the configuration of the second example embodiment will be described. FIG. 3 is a block diagram illustrating a configuration of an electrical power control system 1000 in the second example embodiment. In the description of the second example embodiment, configuration parts having the same name as that of parts configuring the electrical power control system in the first example embodiment are indicated by the same signs and duplicate explanations for the common parts will be omitted.

With reference to FIG. 3, the electrical power control system 1000 includes the electrical power source unit 1, the battery unit 2, and the electrical power control apparatus 4. The electrical power control system 1000 is, for example, a storage system or a server system.

The electrical power source unit 1 supplies the electrical power to the battery unit 2 and the target of supply 3 via the electrical power control apparatus 4. The electrical power source unit 1 includes an AC/DC (Alternating Current/Direct Current) conversion unit 11 and an electrical power measurement unit 12.

The AC/DC conversion unit 11 includes a circuit configuration that converts the AC voltage of electrical power supplied from a commercial electrical power source to a DC voltage and outputs the converted electrical power.

The electrical power measurement unit 12 includes a circuit configuration that measures the output electric power of the electrical power source unit 1.

The battery unit 2 includes a first storage battery 21-1, a second storage battery 21-2, and a battery management unit 22. When the first storage battery 21-1 and the second storage battery 21-2 are not explicitly distinguished from each other, they may be expressed as storage batteries 21.

The storage batteries 21 are secondary batteries that charge electrical power through receiving the electrical power from the electrical power source unit 1 and discharge the stored electrical power. Examples of secondary batteries functioning as the storage batteries 21 include a lead storage battery, a nickel-metal hydride battery, and a lithium ion battery.

Further, the storage batteries 21 include a configuration that discharges electricity upon receiving an instruction from the battery management unit 22. Although the second example embodiment describes an example in which the battery unit 2 includes two storage batteries 21, the battery unit 2 may include one or more storage batteries 21, and the number of the storage batteries 21 is not limited.

The battery management unit 22 includes a battery control unit 221 and a memory 222.

The battery control unit 221 has a control function of obtaining information on the amounts of charge of the first storage battery 21-1 and the second storage battery 22-2. Further, the battery control unit 221 also has a control function of determining whether the amounts of charge of the storage batteries 21 are equal to or higher than a threshold. The threshold is stored in the memory 222 as charge/discharge-switching information.

Further, the battery control unit 221 has a function of controlling the charge/discharge of the first storage battery 21-1 and the second storage battery 21-2. Specifically, the battery control unit 221 supplies the electrical power of the power source unit 1 to the storage batteries 21, for example, when the electrical power of the electrical power source unit 1 is supplied to the battery unit 2 via the electrical power control apparatus 4. As a result, the storage batteries 21 are charged. Further, the battery control unit 221, when instructed by the electrical power control apparatus 4 to discharge the storage batteries 21, instructs the storage batteries 21 to discharge electricity. The battery control unit 221 may control the charge/discharge of each of the storage batteries 21 independently.

The memory 222 stores charge/discharge-switching information to be used by the battery control unit 221 for controlling the batteries. For example, the charge/discharge-switching information includes information on the threshold. For example, the information on the threshold includes first and second thresholds. The first threshold is a value corresponding to the amounts of charge of the storage batteries 21, which can be supplied to the target of supply 3 during a predetermined time. The second threshold is a value corresponding to the amounts of charge of storage batteries 21 requiring charge. In general, the first threshold is the same as the second threshold, or is larger than the second threshold.

The first threshold may be an amount of electrical power calculated based on the amount of electrical power consumption of the target of supply 3, or an amount of electrical power lower than the full charges of the storage batteries 21 in order to prevent overcharging. Further, the first threshold may be set for each of the storage batteries 21 independently, or be the same value for all of the storage batteries 21. In other words, the first threshold only have to be a value that enables electrical power supply from the storage batteries 21 to the target of supply 3.

Figures 4, 5:
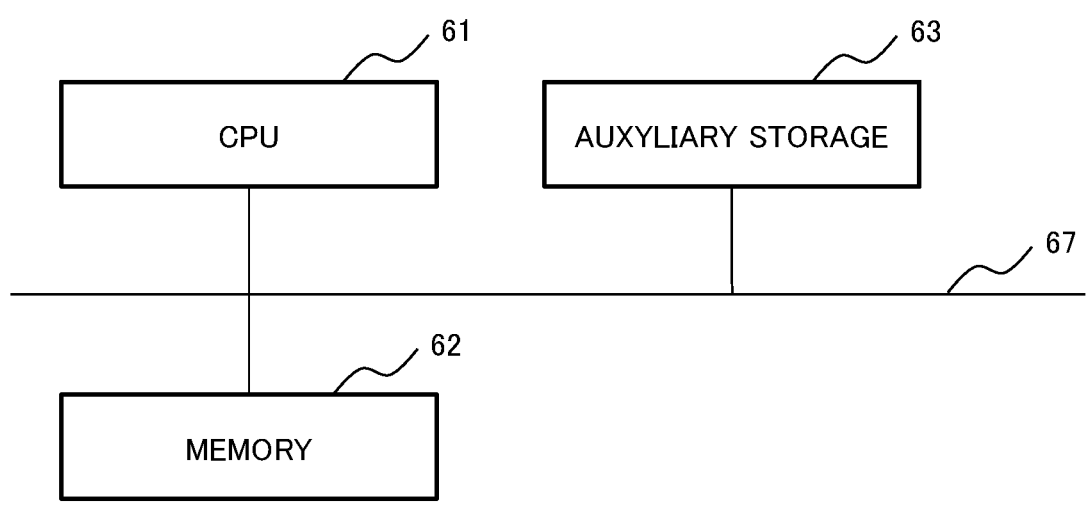
FIG. 4 is a table illustrating one example of charge/discharge-switching information in the second example embodiment.
FIG. 5 is a block diagram illustrating one example of a hardware configuration of an electrical power control apparatus in the second example embodiment.

Alternatively, as illustrated in FIG. 4, the thresholds may be set depending on the percentages of charge of the storage batteries 21. FIG. 4 is a table illustrating one example of charge/discharge-switching information in the second example embodiment. With reference to FIG. 4, the first threshold is set to be a percentage of charge that is 80% of the full charges of the storage batteries 21, and the second threshold is set to be a percentage of charge that is 30% of the full charges of the storage batteries 21. In this case, when the amounts of charge of the storage batteries 21 are equal to or higher than 80% of the full charge, the battery control unit 221 determines that the amounts of charge of the storage batteries 21 are equal to or higher than the first threshold. In addition, when the amounts of charge of the storage batteries 21 are equal to or lower than 30% of the full charge, the battery control unit 221 determines that the amounts of charge of the storage batteries 21 are equal to or lower than the second threshold.

The electrical power control apparatus 4 includes a configuration that controls electrical power supply to the target of supply 3. The target of supply 3 is a apparatus that operates through receiving electrical power supply from the electrical power source unit 1 and the battery unit 2. For example, it is a storage apparatus or a server apparatus.

The electrical power control apparatus 4 includes the supply control unit 41, a power source management unit 42 and a monitoring unit 43. The electrical power control apparatus 4 is, for example, a midplane, one side of which is connected to a storage medium, and the other side of which is connected to a unit such as the electrical power source unit 1 and the battery unit 2.

The supply control unit 41 has a function of controlling electrical power supply from the electrical power source unit 1 and the battery unit 2 to the target of supply 3. In the second example embodiment, the supply control unit 41 is a circuit including a switching circuit that switches from the electrical power of the electrical power source unit 1 to the electrical power of the battery unit 2 and vice versa and a control apparatus that controls the switching.

For example, the supply control unit 41 supplies the electrical power of the battery unit 2 in preference to the electrical power of the electrical power source unit 1 to the target of supply 3 when the amounts of charge of the storage batteries 21 included in the battery unit 2 are equal to or higher than the first threshold. The supply control unit 41 also supplies the electrical power from the electrical power source unit 1 to the target of supply 3 when the amounts of charge of the storage batteries 21 included in the battery unit 2 are lower than the first threshold.

The power source management unit 42 has a function of obtaining information on a measurement value from the electrical power measurement unit 12 and controlling the output electric power of the electrical power source unit 1 to be a set value. For example, the power source management unit 42 keeps constant the load of electrical power source unit 1, and controls the output electric power of the electrical power source unit 1 to be a value or within a range of electrical power. The value and the set range of electrical power are respectively a value and a range of electrical power set for in order that the electrical power source unit 1 exhibits an excellent electrical power conversion efficiency.

Further, the power source management unit 42 has a function of distributing the electrical power from the electrical power source unit 1 to the battery unit 2 and the target of supply 3 via the supply control unit 41. For example, the power source management unit 42 is a circuit that includes not only a path for supplying the electrical power from the electrical power source unit 1 to the supply control unit 41, but also a control apparatus. The power source management unit 42, when it is supplying the electrical power of electrical power source unit 1 to the target of supply 3 via the supply control unit 41, supplies a surplus of electrical power, if any, of the electrical power source unit 1 to the battery unit 2 via the supply control unit 41.

Further, the power source management unit 42, when it is supplying electrical power from the battery unit 2 to the target of supply 3 by the operation of the supply control unit 41, stops the electrical power supply from the electrical power source unit 1 to the target of supply 3.

The monitoring unit 43 has a function of monitoring operating condition and power consumption of the target of supply 3. For example, when the operation of the target of supply 3 is stopped, the monitoring unit 43 notifies the power source management unit 42 and the battery management unit 22 of the stop, and stops the electrical power supply from the electrical power source unit 1 and the battery unit 2.

FIG. 5 is a block diagram illustrating one example of a hardware configuration of the control-relevant part in the electrical power control apparatus 4 in the second example embodiment.

The control part of the electrical power control apparatus 4 includes a CPU (Central Processing Unit) 61, a memory 62, and an auxiliary storage 63, and the configuration elements are connected to each other via a bus 67.

The CPU 61 is a central processing unit executing a computer program (hereinafter also abbreviated as program) that controls the operation of the electrical power control apparatus 4. The memory 62 is a main memory apparatus storing an unzipped program. The auxiliary storage 63 stores a program that controls the circuit operation of the supply control unit 41, the power source management unit 42, and the monitoring unit 43. The CPU 61 executes a predetermined process based on the program stored in the auxiliary storage 63, to control the operation of the electrical power control apparatus 4. For example, the CPU 61 achieves the function of controlling the supply control unit 41, the power source management unit 42, and the monitoring unit 43, based on the program stored in the auxiliary storage 63.

Although the second example embodiment describes the CPU 61 as an apparatus reading and executing the program stored in auxiliary storage 63, the program can also be provided to the CPU 61, as a program stored in a storage medium such as CDROM (Compact Disc Read Only Memory).

Since the hardware configuration of the control part of the battery management unit 22 in the second example embodiment is similar to that of the electrical power control apparatus 4, its detailed description will be omitted. As is the case in the above-mentioned electrical power control apparatus 4, the control function of the battery management unit 22 can be achieved by the CPU 61 executing a predetermined process based on the program stored in the auxiliary storage 63.

Next, an operation of the electrical power control system 1000 in the second example embodiment will be explained.

Figure 6:
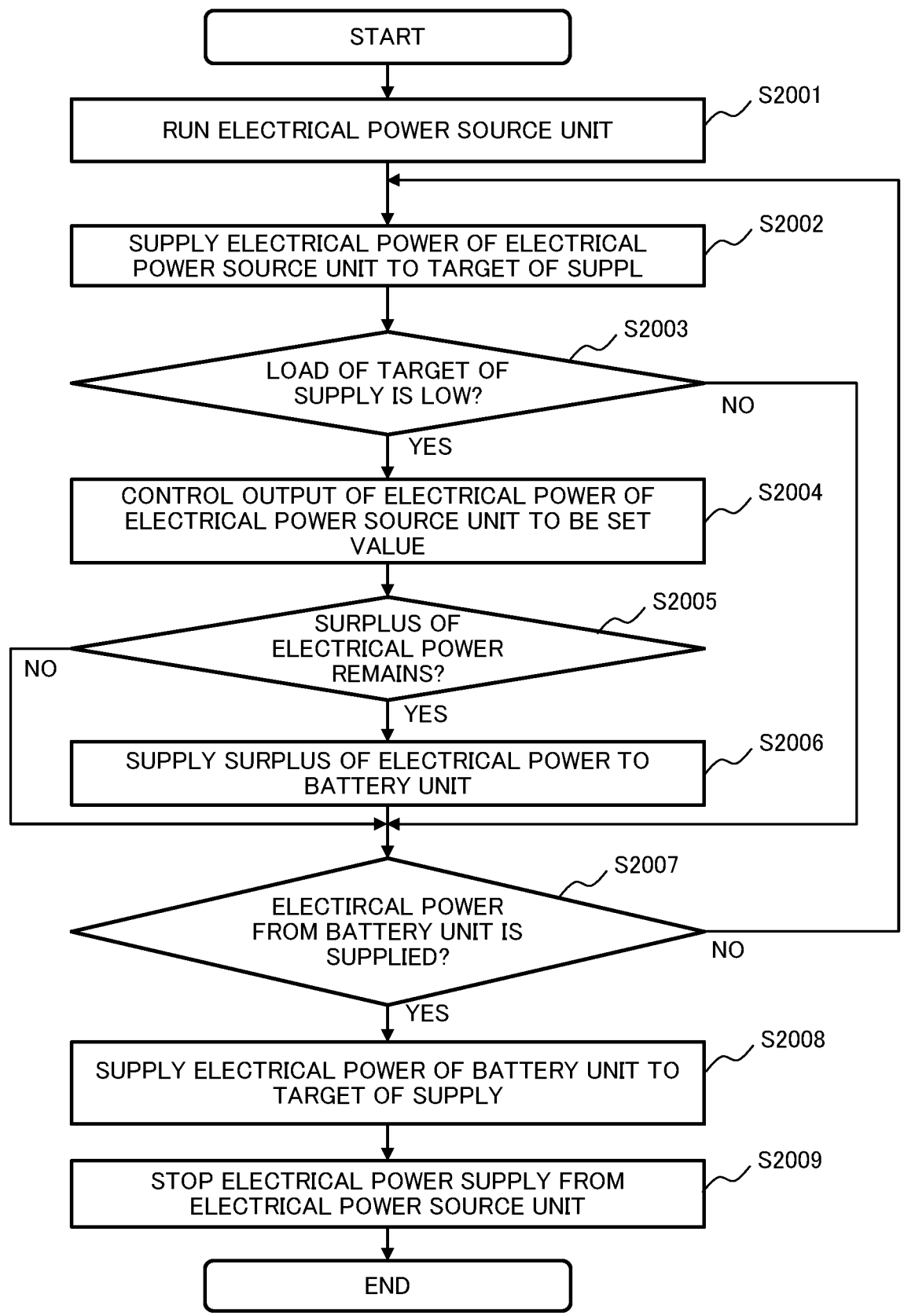
FIG. 6 is a flowchart illustrating an example of an operation of the electrical power control apparatus in the second example embodiment.

FIG. 6 is a flowchart illustrating an operation of the electrical power control apparatus 4 including the operation of the charging storage battery 21.

First, the electrical power control apparatus 4 turns on and run the electrical power source unit 1 (step S2001).

When the electrical power source unit 1 starts operating, the AC/DC conversion unit 11 of the electrical power source unit 1 starts the operation of converting the AC voltage of electrical power supplied from a commercial electrical power source to a DC voltage. As a result, the electrical power from the electrical power source unit 1 is supplied to the target of supply 3 via the electrical power control apparatus 4 (step S2002). Specifically, the power source management unit 42 sends the electrical power supplied from the electrical power source unit 1 to the supply control unit 41, which in turns supplies the electrical power to the target of supply 3.

Then, the power source management unit 42 obtains the measurement value from the electrical power measurement unit 12. The power source management unit 42 obtains information, from the monitoring unit 43, on the power consumption of the target of supply 3. Then, the power source management unit 42 determines, based on the obtained information, whether the load of the target of supply 3 is low (step 2003). For example, the power source management unit 42 determines whether the power consumption of the target of supply 3 is lower than a value or a range of electrical power. The value and the set range of electrical power are respectively a value and a range of electrical power set for in order that the electrical power source unit 1 exhibits an excellent electrical power conversion efficiency.

When the load of the target of power supply 3 is high (step S2003: NO), that is, when the power consumption of the target of electrical power supply 3 is higher than the set value or the set range of electrical power for exhibiting the excellent electrical power conversion efficiency of the electrical power source unit 1, the power source management unit 42 determines that the output electric power cannot be controlled in such a way that the electrical power conversion efficiency of the electrical power source unit 1 is improved, and the procedure goes to the step S2007.

On the other hand, when the load of the target of supply 3 is low (step S2003: YES), the power source management unit 42 controls the output electric power of the electrical power source unit 1 to be a set value (step S2004). For example, when the load of the target of supply 3 is lower than the set value or the set range of load for exhibiting the excellent electrical power conversion efficiency of the electrical power source unit 1, the power source management unit 42 increases the load onto the electrical power source unit 1 and controls the output electric power of the electrical power source unit 1 to be the set value or within the set range of electrical power in order that the electrical power source unit 1 exhibits the excellent electrical power conversion efficiency. In other words, the power source management unit 42 keeps constant the load onto the electrical power source unit 1, and controls the output electric power of electrical power source unit 1 to be a value or within a range of electrical power in order that the electrical power source unit 1 exhibits an excellent electrical power conversion efficiency.

The power source management unit 42 determines whether the electrical power of the electrical power source unit 1 can provide the surplus of electric power (step S2005). For example, the power source management unit 42 compares the output electric power of the electrical power source unit 1 and the power consumption of the target of supply 3, and when the output electric power of the electrical power source unit 1 is larger than the power consumption of the target of supply 3, determines that the surplus of electric power can be provided.

When the power source management unit 42 determines that no surplus electric power can be provided (step S2005: NO), the procedure goes to the step S2007. On the other hand, when the power source management unit 42 determines that the surplus of electric power can be provided (step S2005: YES), the power source management unit 42 supplies the power to the battery unit 2 via the supply control unit 41 (step S2006).

Then, the supply control unit 41 determines whether the electrical power of the battery unit 2 is supplied to the electrical power control apparatus 4 (step S2007). When the electrical power of the battery unit 2 is not supplied to the electrical power control apparatus 4 (step S2007: NO), the procedure returns to the step S2002 and the supply control unit 41 supplies the electrical power of the electrical power source unit 1 to the target of supply 3. The electrical power supply from the battery unit 2 to the electrical power control apparatus 4 is performed, for example, when the amounts of charge of the storage batteries 21 are equal to or higher than the first threshold.

When the electrical power of the battery unit 2 is supplied to the electrical power control apparatus 4 (step S2007: YES), the supply control unit 41 supplies the electrical power of the battery unit 2 in preference to the electrical power of the electrical power source unit 1 to the target of supply 3 (step S2008).

The power source management unit 42, upon confirming that the electrical power of the battery unit 2 is supplied to the target of supply 3 via the supply control unit 41, stops the electrical power supply from the electrical power source unit 1 to the target of supply 3 (step S2009).

In this manner, the operation of the electrical power control apparatus 4 including the operation of the charging storage batteries 21 is performed as described above.

In the above-described example of the operation, the supply control unit 41 supplies the electrical power of the battery unit 2 in preference to the electrical power of the battery unit 1 to the target of supply 3, depending on the electrical power supply from the battery unit 2 to the electrical power control apparatus 4, but the present invention is not limited to this example. For example, the power source management unit 42 may obtain, from the battery unit 2, information on the amount of charge of the battery unit 2 and control the electrical power based on the information in such a way that the electrical power of the battery unit 2 in preference to the electrical power of the electrical power source unit 1 is supplied to the target of supply 3.

Further, in the step S2004, the power source management unit 42 increases the load onto the electrical power source unit 1, and controls the electrical power source unit 1, and by the control, the output electric power of the electrical power source unit 1 becomes the set value or within the set range of electrical power in order that the electrical power source unit 1 exhibits the excellent electrical power conversion efficiency. Accordingly, the electrical power source unit 1 can operate in the condition of excellent electrical power conversion efficiency. Further, the battery unit 2 is charged with electrical power supplied from the electrical power source unit 1 in an operational condition of excellent electrical power conversion efficiency, and therefore, the battery unit 2 can be charged efficiently.

Further, the power source management unit 42 may control the output electric power of the electrical power source unit 1 to be a value for taking a peak value of the electrical power conversion efficiency. Thus, the electrical power source unit 1 operates in the condition of excellent electrical power conversion efficiency. Accordingly, power loss owing to electrical power conversion decreases and the storage batteries 21 can be charged efficiently. Further, when the amount of charge of the battery unit 2 is equal to or higher than the threshold, the electrical power charged efficiently in the storage batteries 21 in preference to the electrical power of the electrical power source unit 1 is supplied to the target of supply 3. Accordingly the electrical power control system 1000 can reduce whole electrical power loss.

In the step S2003, the electrical power supply may be possible from the battery unit 2 to the target of supply 3 even when the load of the target of supply 3 is higher than a load that is of the set value or within the set range of electrical power in such a way that the electrical power source unit 1 exhibits the excellent electrical power conversion efficiency. In this case, the power source management unit 42 may control the load onto the electrical power source unit 1 to be the load which is of the set value or within the set range of electrical power in such a way the electrical power source unit 1 exhibits the excellent electrical power conversion efficiency, and control the electrical power supply in order that an amount of shortage of electrical power may be supplied from the battery unit 2. As a result, the power source management unit 42 can run the electrical power source unit 1 in the condition of excellent electrical power conversion efficiency even when the target of supply 3 has a high load.

Figure 7:
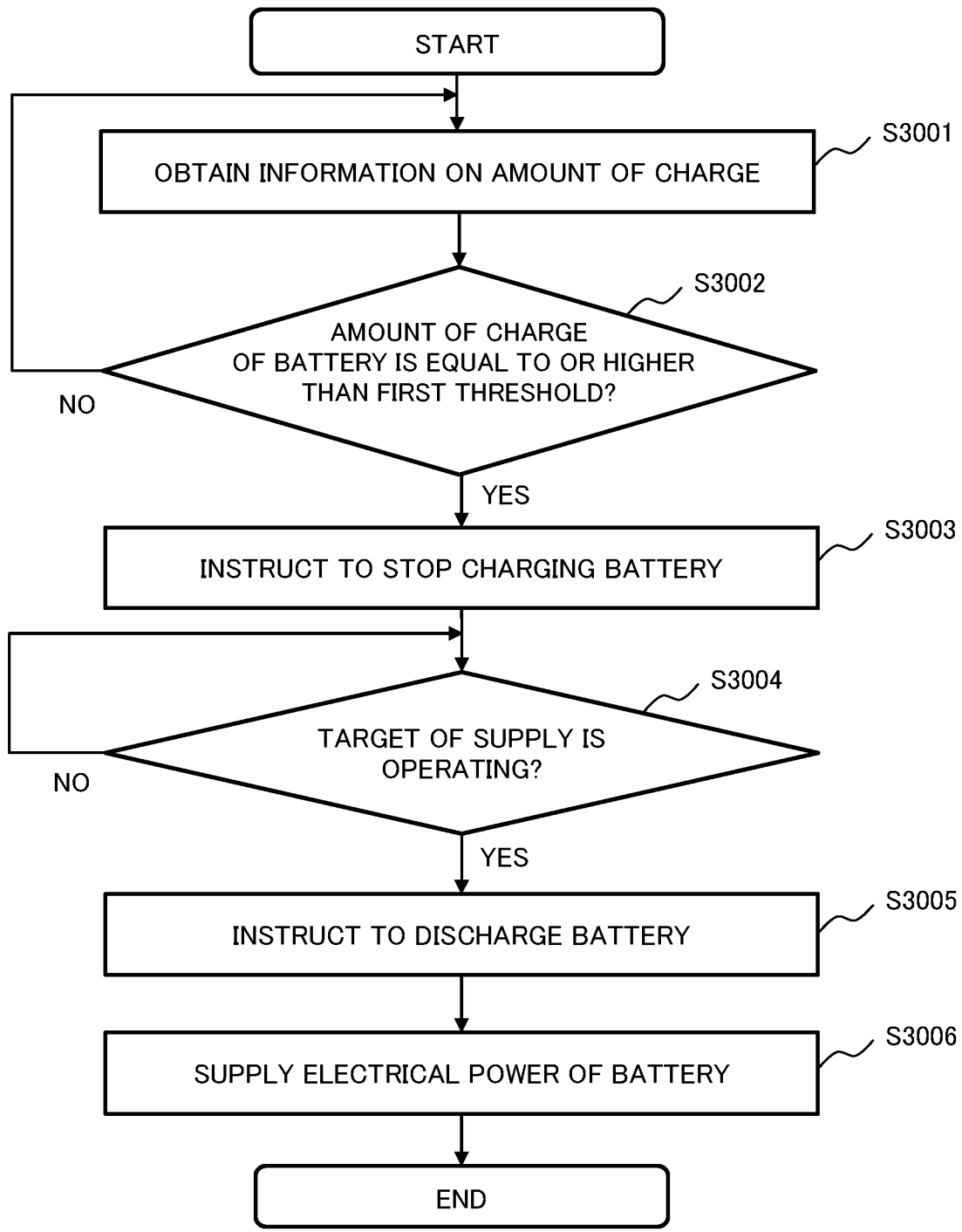
FIG. 7 is a flowchart illustrating an example of an operation of a battery management unit in the second example embodiment.

FIG. 7 is a flowchart illustrating an example of the operation of the battery management unit 22 during the operation of charging the storage batteries 21.

The battery control unit 221 obtains information on the amounts of charge of the storage batteries 21 during charging (step S3001). Then, the battery control unit 221 determines, based on the obtained information, whether the amounts of charge of the storage batteries 21 are equal to or higher than the first threshold (step S3002). For example, the first threshold is each of the amounts of charge of the storage batteries 21 that supplies to the target of supply 3 for a predetermined time. Alternatively, as shown in FIG. 4, the first threshold may be a percentage of the electrical power storage of the storage batteries 21. For example, in the charge/discharge-switching information, it is assumed that the first threshold is 80%. When the amounts of charge of the first storage battery 21-1 and the second storage battery 21-2 are 80% or higher of the full charge, the battery control unit 221 determines that the amounts of charge of the storage batteries 21 are equal to or higher than the first threshold. Alternatively, when either of the amounts of charge of the first storage battery 21-2 and the second storage battery 21-1 is 80% or higher of the full charge, the battery control unit 221 may determine that the amounts of charge of the storage batteries 21 are equal to or higher than the first threshold.

The battery control unit 221, when determining that the amounts of charge of the storage batteries 21 are not equal to or higher than the first threshold (step S3002: NO), repeats the operation of the step S3001 or later after a predetermined elapsed time. In other words, the battery control unit 221 again obtains the information on the amounts of charge of the storage batteries 21 and determines whether the amounts of charge of the storage batteries 21 are equal to or higher than the first threshold.

When the amounts of charge of the storage batteries 21 are equal to or higher than the first threshold (step S3002: YES), the battery control unit 221 instructs the stop of charging the storage batteries 21 (step S3003).

Then, the battery control unit 221 obtains the information on the operating condition of the target of supply 3 from the monitoring unit 43 of the electrical power control apparatus 4, for example, via the supply control unit 41, and determines whether the target of supply 3 is under operation (step S3004). When the target of supply 3 is not under operation (step S3004: NO), the battery control unit 221 waits until receiving, from the monitoring unit 43, notification to inform that the target of supply 3 has started to operate.

On the other hand, when the target of supply 3 is under operation (step S3004: YES), the battery control unit 221 instructs the storage batteries 21 to discharge electricity (step S3005). For example, the battery control unit 221 instructs the first storage battery 21-1 to discharge electricity. In this way, the battery control unit 221 can perform the control of charge/discharge of each of the storage batteries 21 independently.

The storage batteries 21 discharge electricity upon receiving, from the battery control unit 221, the instruction to discharge electricity. In other words, the electrical power from the battery unit 2 is supplied to the supply control unit 41 via the battery control unit 221. As a result, the electrical power of the battery unit 2 is supplied to the target of supply 3.

In this way, the operation of the battery management unit 22 during charging the storage batteries 21 is performed. The electrical power supply from the electrical power source unit 1 is switched to the electrical power supply from the battery unit 2, depending on charging the storage batteries 21 as described above and the electrical power supply to the target of supply 3.

In the step S3004, the battery control unit 221 obtains, from the monitoring unit 43, information on the operating condition of the target of supply 3. In addition to this, when the monitoring unit 43 obtains information on the power consumption of the target of supply 3, the battery control unit 221 may also obtain information on the power consumption of the target of supply 3 and determine whether to discharge the battery unit 2 taking into account the obtained information.

Specifically, the battery control unit 221 obtains, from the monitoring unit 43, information on the power consumption of the target of supply 3, and compares the obtained information with the set value or the set range of electrical power in such a way that the electrical power source unit 1 exhibits the excellent electrical power conversion efficiency. Further, when the power consumption of the target of supply 3 matches the set value or the set range of electrical power that the electrical power source unit 1 exhibits the excellent electrical power conversion efficiency, the battery control unit 221 does not instruct the storage batteries 21 to discharge electricity. As a result, the supply control unit 41 supplies the electrical power from the electrical power source unit 1 to the target of supply 3.

In such a control, when the target of supply 3 is operating by the electrical power in order that the electrical power source unit 1 exhibits the excellent electrical power conversion efficiency, the electrical power from the electrical power source unit 1 in preference to the electrical power of battery unit 2 is supplied to the target of supply 3. As a result, the electrical power control apparatus 4 can prevent the deterioration of the storage batteries 21 provided in the battery unit 2 because of reducing the use of the storage batteries 21 while keeping the electrical power source unit 1 operating in the efficient operational condition.

Next, an example of the switching operation of the storage batteries 21 in the battery unit 2 will be described.

Figure 8:
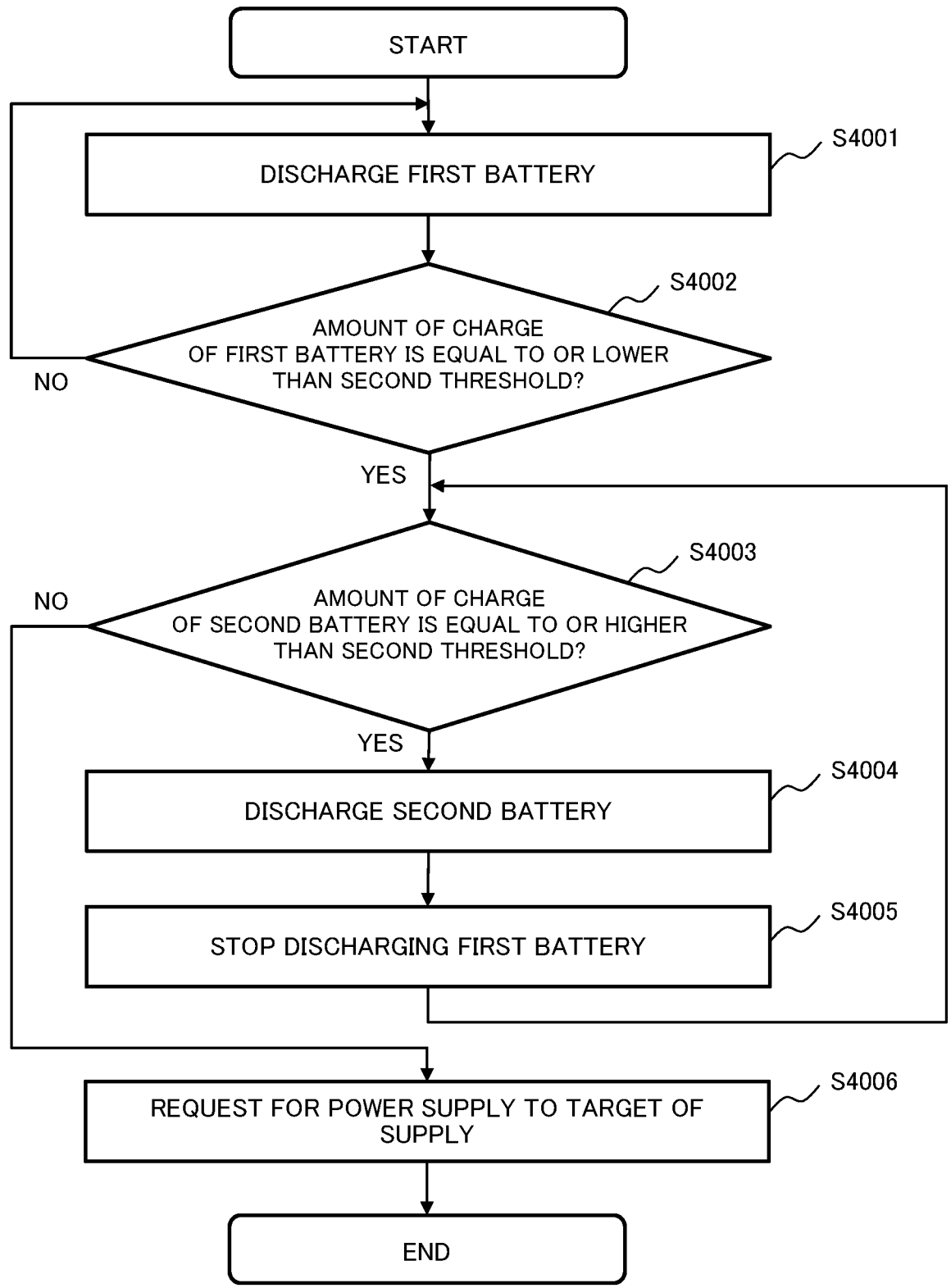
FIG. 8 is a flowchart illustrating an example of a switching operation of electrical power supply by the electrical power control apparatus in the second example embodiment.

FIG. 8 is a flowchart illustrating an example of the operation of the battery unit 2 switching a battery to discharge electricity between the storage batteries 21. This flowchart describes the operation of switching the battery to discharge electricity from the first storage battery 21-1 to the second storage battery 21-2.

For example, the first storage battery 21-1 starts to discharge electricity (step S4001). The supply control unit 41 supplies the discharged electrical power to the target of supply 3 as the electrical power of the battery unit 2. This discharge decreases the amount of charge of the first storage battery 21-1. The battery control unit 221 obtains the information on the amount of charge of the first storage battery 21-1 and determines, based on the obtained information, whether the amount of charge of the first storage battery 21-1 is equal to or lower than the second threshold (step S4002). In this instance, the second threshold is the value corresponding to the amount of charge representing the necessity of battery charge.

When the amount of charge of the first storage battery 21-1 is not equal to or lower than the second threshold (step S4002: NO), the first storage battery 21-1 continues discharging electricity.

When the amount of charge of the first storage battery 21-1 becomes equal to or lower than the second threshold, (step S4002: YES), the battery control unit 221 obtains the information on the amount of charge of the second storage battery 21-2, and determines whether the amount of charge of the second storage battery 21-2 is equal to or higher than the second threshold (step S4003).

When the amount of charge of the second storage battery 21-2 is equal to or higher than the second threshold (step S4003: YES), the battery control unit 221 instructs the second battery 21-2 to discharge electricity and the second battery 21-2 starts to discharge electricity (step S4004). After confirming that the second storage battery 21-2 started to discharge electricity, the battery control unit 221 instructs the first storage battery 21-1 to stop discharging electricity and as a result, the first storage battery 21-1 stop discharging electricity (step S4005).

After a predetermined elapsed time, the battery control unit 221 repeats the operation of the step S4003 or later.

When the amount of charge of the second storage battery 21-2 is lower than the second threshold (step S4003: NO), the battery control unit 221 determines that the second storage battery 21-2 cannot discharge electricity, and then sends to the power source management unit 42 a request for switching of electrical power supply to the target of supply 3 (step S4006). Then, the power source management unit 42 makes the electrical power source unit 1 start to supply the electrical power. Thus, the supply control unit 41 starts to supply the electrical power from the electrical power source unit 1 to the target of supply 3.

Thus, the battery unit 2 performs the switching operation of the storage batteries 21.

The electrical power control system 1000 in the second example embodiment can run the electrical power source unit 1 in the efficient condition. The reason is that when the amount of the electrical power storage of the battery unit 2 is equal to or higher than the first threshold, the supply control unit 41 supplies the electrical power of battery unit 2 in preference to the electrical power of the electrical power source unit 1 to the target of supply 3.

In other words, the electrical power conversion efficiency of the electrical power source unit 1 varies owing to the variation of the load thereon. The supply control unit 41 supplies the electrical power of the battery unit 2 in preference to the electrical power of the electrical power source unit 1 to the target of supply 3, and thereby can reduce the amount of electrical power to be supplied from the electrical power source unit 1 to the target of supply 3. As a result, the electrical power source unit 1 receives less influence of the load variation of the target of supply 3. Therefore, the electrical power source unit 1 can operate efficiently.

The electrical power control system 1000 in the second example embodiment can operate in a power-saving manner. The reason is that when the amount of charge of the battery unit 2 is equal to or higher than the first threshold, the supply control unit 41 supplies the electrical power of the battery unit 2 to the target of supply 3 and the power source management unit 42 stops the electrical power supply from the electrical power source unit 1. As a result, the electrical power control system 1000 can reduce the electrical power supply from the electrical power source unit 1, and thereby can perform power saving.

Third Example Embodiment

Figure 9:
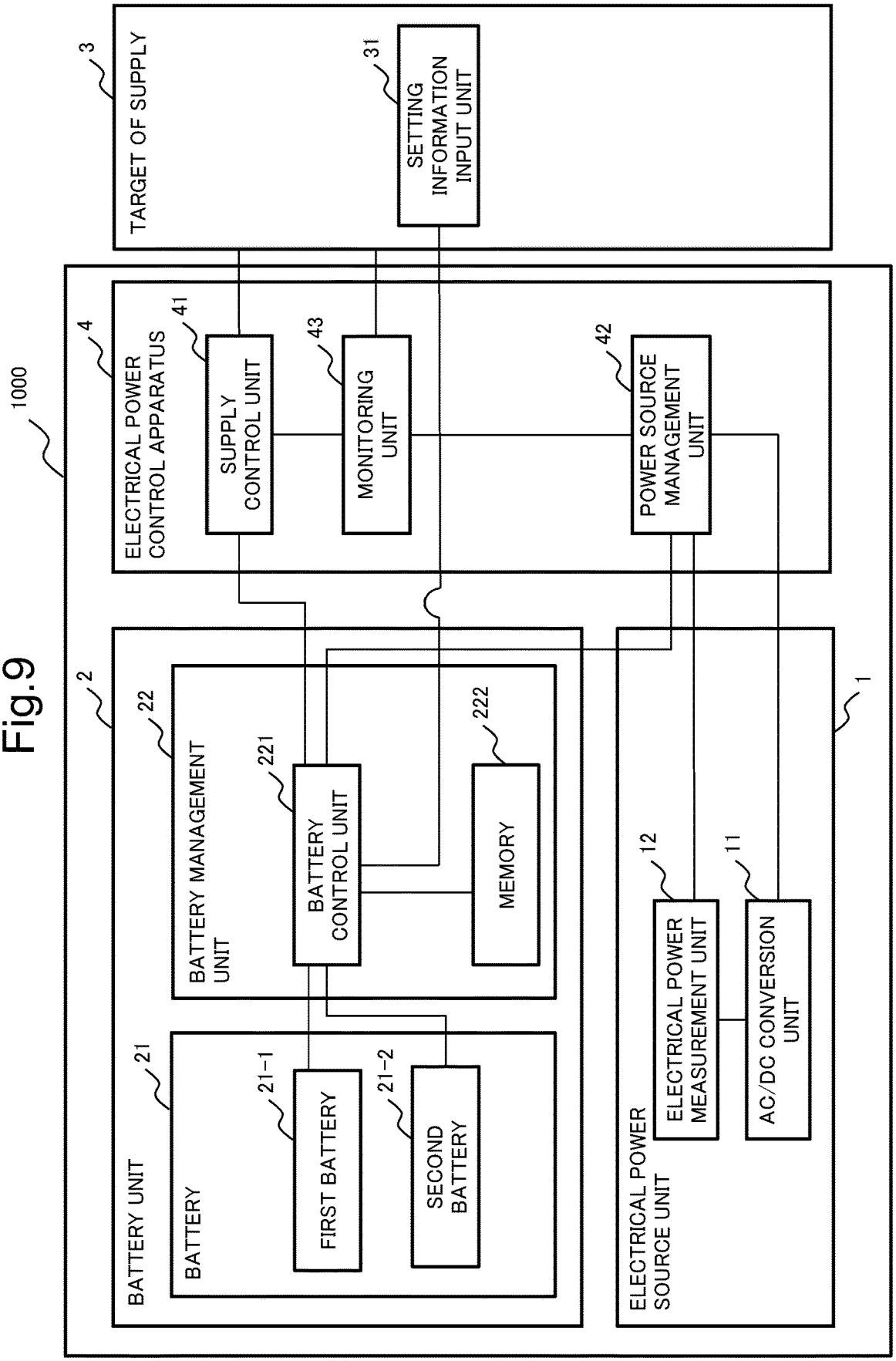
FIG. 9 is a block diagram illustrating a configuration of an electrical power control system in third example embodiment according to the present invention.

A configuration of third example embodiment according to the present invention will be described below. FIG. 9 is a block diagram illustrating the configuration of an electrical power control system in the third example embodiment. In the description of the third example embodiment, configuration parts having the same name as that of constituent parts configuring the electrical power control systems in the first and the second example embodiments are indicated by the same signs and duplicate explanations for the common parts will be omitted.

The electrical power control system 1000 in the third example embodiment has the battery management unit 22 of the battery unit 2 operating differently from the battery management unit 22 in the second example embodiment. Other configuration parts in the electrical power control system 1000 of the third example embodiment are similar to those in the electrical power control system 1000 of the second example embodiment, and explanations for the same configurations as those in the second example embodiment will be omitted. In the third example embodiment, the target of supply 3 includes a setting information input unit 31. The setting information input unit 31 has a function of receiving information input by a user and outputting the received information to the battery control unit 221 via the supply control unit 41.

The battery management unit 22 includes the battery control unit 221 and a memory 222. The battery control unit 221 has, in addition to the function in the second example embodiment, a function of receiving information relevant to the setting of the operation of charging the first storage battery 21-1 and the second storage battery 21-2 as information on setting for battery charge. The battery control unit 221 controls the charge/discharge of the first storage battery 21-1 and the second storage battery 21-2 based on the information on setting for battery charge. Specifically, the battery control unit 221 receives the information (command) on the setting input by a user from the setting information input unit 31, and controls the charge/discharge of the storage batteries 21 based on the setting information.

The memory 222 stores information on setting for battery charge output from the setting information input unit 31. The information on setting for battery charge is setting information which is used for charging the first storage battery 21-1 when the amount of charge of the first storage battery 21-1 becomes equal to or lower than the second threshold.

FIG. 10 is a table illustrating one example of the information on setting for battery charge in the third example embodiment. With reference to FIG. 10, the information on setting for battery charge includes percentages of charge each associated with setting items 1 to 3. The percentages of charge in the information on setting for battery charge are sets of information indicating a timing of charging the first storage battery 21-1 after the amount of charge of the first storage battery 21-1 becomes equal to or lower than the second threshold and discharging electricity is switched to discharging electricity from the second storage battery 21-2. For example, in the setting 1, after the amount of charge of the second storage battery 21-2 becomes equal to or lower than 100% of the full charge, the battery control unit 221 starts to charge the first storage battery 21-1. In other words, the battery control unit 221 requests the electrical power source unit 1 to supply the electrical power (for example immediately) after the second storage battery 21-2 started discharging electricity. Then, the battery control unit 221 supplies the electrical power from the electrical power source unit 1 to the first storage battery 21-1, and then, the first storage battery 21-1 starts to charge the battery.

In the setting 2, the battery control unit 221 starts to charge the first storage battery 21-1 when the amount of charge of the second storage battery 21-2 becomes equal to or lower than 50% of the full charge. In other words, the battery control unit 221 monitors the amount of charge of the second storage battery 21-2 and requests the electrical power source unit 1 to supply the electrical power before a surplus of the electrical power storage thereof is depleted. Then, the battery control unit 221 supplies the electrical power from the electrical power source unit 1 to the first storage battery 21-1. The first storage battery 21-1 starts to charge the battery.

In the setting 3, when the amount of charge of the second storage battery 21-2 becomes equal to or lower than 10% of the full charge, the battery control unit 221 determines that the battery unit 2 cannot supply the electrical power to the target of supply 3, and switches the electrical power supply to the target of supply 3 from the battery unit 2 to the electrical power source unit 1. Then, the battery control unit 221 make the first storage battery 21-1 charge using the electrical power not supplied to the target of supply 3 (in other words, surplus of electric power) out of the electrical power output from the electrical power source unit 1.

The hardware configuration of the control part of the battery management unit 22 in the third example embodiment is similar to that in the second example embodiment, and the description thereof will be omitted.

Figure 11:
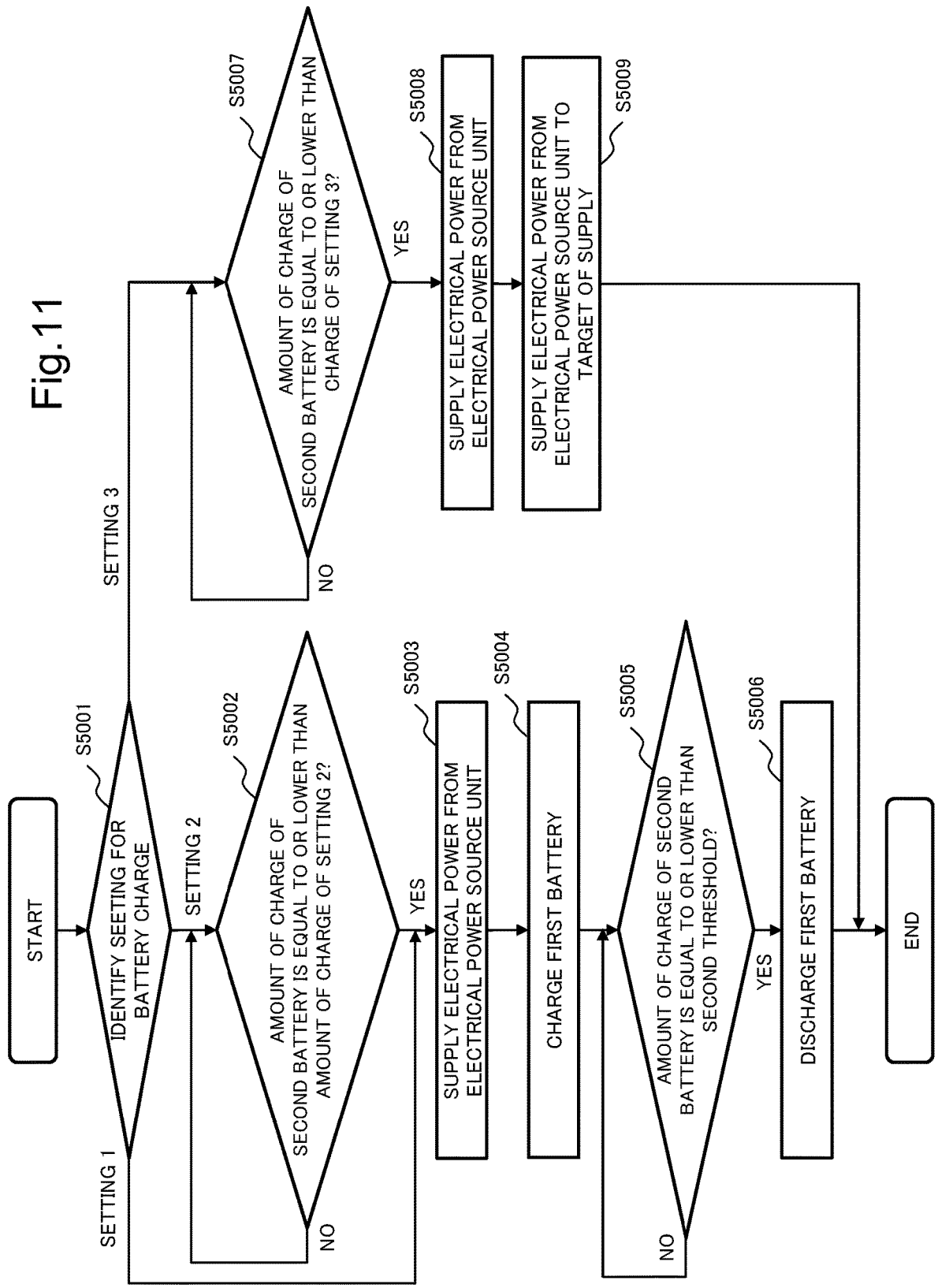
FIG. 11 is a flowchart illustrating an operation of the electrical power control system in the third example embodiment.

Next, the operation of the electrical power control system 1000 in the third example embodiment will be explained. FIG. 11 is a flowchart illustrating the operation of the electrical power control system 1000 in the third example embodiment.

In this instance, it is assumed first that the amount of charge of the first storage battery 21-1 is equal to or lower than the second threshold, and that the second storage battery 21-2 is thereby discharging electricity, and as a result, the electrical power is supplied from the battery unit 2 to the target of supply 3 via the supply control unit 41.

The battery control unit 221 obtains the setting information output from the setting information input unit 31 and identifies the obtained setting information (step S5001).

When the setting information obtained from the setting information input unit 31 indicates the setting 1 (step S5001: setting 1), the battery control unit 221 reads out the percentage of the amount of charge corresponding to the setting 1 (100%) in the information on setting for battery charge stored in the memory 222. In this case, since the amount of charge in the setting 1 is 100%, the battery control unit 221 advances the procedure to the step S5003 that requests the power source management unit 42 to supply the electrical power.

When the setting information obtained from the setting information input unit 31 indicates the setting 2 (step S5001: setting 2), the battery control unit 221 reads out the percentage of the amount of charge corresponding to the setting 2 (50%) in the information on setting for battery charge stored in the memory 222. In this case, the battery control unit 221 obtains information on the amount of charge of the second storage battery 21-2, and, based on the obtained information, determines whether the amount of charge of the second storage battery 21-2 is equal to or lower than an amount of charge corresponding to the percentage of charge corresponding to the setting 2 (step S5002).

When determining that the amount of charge of the second storage battery 21-2 is equal to or lower than the amount of charge corresponding to the percentage of charge corresponding to the setting 2 (step S5002: YES), the battery control unit 221 requests the electrical power supply to battery unit 2 to the power source management unit 42. Then, the power source management unit 42 supplies electrical power from the electrical power source unit 1 to the battery unit 2 (step S5003). When determining that the amount of charge of the second storage battery 21-2 is higher than the amount of charge corresponding to the percentage of charge corresponding to the setting 2 (step S5002: NO), the battery control unit 221 makes the second storage battery 21-2 continue discharging electricity. Then after a predetermined elapsed time, the battery control unit 221 repeats the operation of the step S5002 or later.

The battery control unit 221 make the first storage battery 21-1 charge using the electrical power from the electrical power source unit 1 (step S5004). Further, the battery control unit 221 also determines whether the amount of charge of the second storage battery 21-2 is equal to or lower than the second threshold (step S5005). When the amount of charge of the second storage battery 21-2 is higher than the second threshold (step S5005: NO), the battery control unit 221 can continue discharging the second storage battery 21-2, and accordingly, the second storage battery 21-2 continues discharging the battery. After a predetermined elapsed time, the battery control unit 221 repeats the operation of the step S5005 or later.

When the amount of charge of the second storage battery 21-2 is equal to or lower than the second threshold (step S5006: YES), the battery control unit 221 instructs the first storage battery 21 to discharge electricity. Thus, the first storage battery 21-1 discharges electricity.

Then, the operation of the step S5001 or later is repeated, and as the first storage battery 21-1 continues discharging electricity, the magnitude relation between the amounts of charged power of the first storage battery 21-1 and the second storage battery 21-2 is reversed. In other words, the battery control unit 221 reaches a timing for charging the second storage battery 21 based on the information output from the setting information input unit 31.

In addition, the battery control unit 221, when determining that the setting information output from the setting information input unit 31 indicates the setting 3 (step S5001: setting 3), obtains information on the amount of charge corresponding to the setting 3 from the memory 222. Then, the battery control unit 221 obtains the information on the amount of charge of the second storage battery 21-2 and determines whether the amount of charge of the second storage battery 21-2 is equal to or lower than an amount of charge corresponding to a percentage of charge corresponding to the setting 3 (step S5007).

The battery control unit 221, when determining that the amount of charge of the second storage battery 21-2 is equal to or lower than the amount of charge corresponding to the percentage of charge corresponding to the setting 3 (step S5007: YES), determines that the battery unit 2 cannot supply the electrical power to the target of supply 3. Then, the battery control unit 221 requests the power source management unit 42 to supply the electrical power to the target of supply 3, and the power source management unit 42 supplies the electrical power of the electrical power source unit 1 to the electrical supply control unit 41 (step 5008). The electrical power is supplied to the target of supply 3 (step S5009). In this case, when the electrical power unit 1 can provide the surplus of electric power, the power source management unit 42 supplies the electric power to the battery unit 2. Then, the electrical power control system 1000 repeats the operation of the step S5001 or later in FIG. 11 after the operation of the step S4004 in FIG. 8 was performed.

The electrical power control system 1000 in the third example embodiment can charge the storage batteries 21 appropriately. The reason is that it can determine a timing for charging the storage batteries 21, based on information input by a user who uses the setting information input unit 31 provided in the target of supply 3, in other words, according to a request from the user.

Further, since multiple sets of the setting information are set selectably, users can easily change the setting relevant to the timing of charging the storage batteries 21 according to the electrical power consumption of the target of supply 3. For example, when the target of supply 3 is consuming a large amount of electrical power, in order to avoid difficulty in the back-up by the storage battery 21 owing to the rapid electrical power consumption of the storage battery 21, a user sets the setting 1 that is a setting for charging the storage battery 21 preferentially.

Further, the user can reduce costs for the whole system through changing a timing for charging electricity, depending on an electrical bill to be payed for the system. For example, in a time zone such as nighttime when the electrical bill is inexpensive, the user can set the setting 1 which is a setting for charging the storage batteries 21 actively, and in a time zone such as daytime when the electrical bill is higher, the user can set the setting 3 which is a setting for using the storage battery 21 actively. Thus, the storage battery 21 is charged in a time zone of lower electrical bill, and accordingly, the storage battery 21 keeps the amount of charge high in a time zone of higher electrical bill, allowing the electrical power control system 1000 to use the battery unit 2 preferentially. As a result, the electrical power control system 1000 can reduce costs for the whole system. Note that those settings may be input as appropriate by a user, or may be input in advance as scheduled settings prepared for each time zone.

Figure 12:
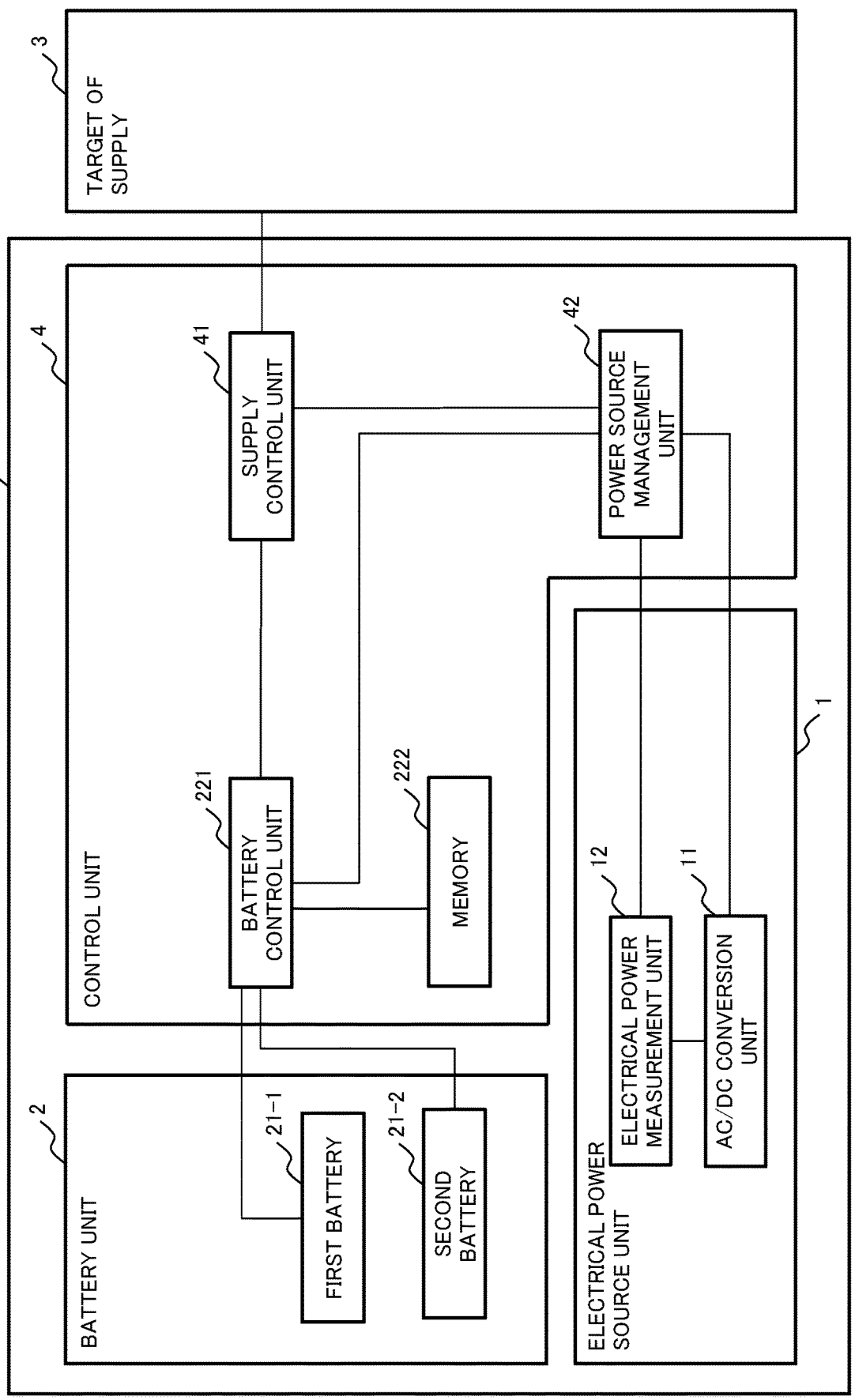
FIG. 12 is a figure illustrating a modification of a configuration of the electrical power control system according to the present invention.

As above, the present invention has been described with reference to the example embodiments, but it is not limited to the above-described example embodiments. For example, the supply control unit 41, the power source management unit 42, the battery control unit 221, and the memory 222 may be configured as an integrated control unit, as illustrated in FIG. 12. In this way, the configuration and the detail of the present invention can be subjected to various modifications conceivable to that those skilled in the art within the scope of present invention.

The invention claimed is:

1. An electrical power control apparatus, which controls electrical power supply from an electrical power source unit and a battery unit to a target of supply, comprising
    a supply control circuit that, when an amount of charge of the battery unit is equal to or higher than a threshold, supplies electrical power of the battery unit in preference to electrical power of the electric power source unit to the target of supply; and
    a power source management circuit that controls the electrical power supply from the electric power source unit via the supply control circuit, wherein when the amount of charge of the battery unit is lower than the threshold and a load of the target of power supply is lower than a set load when a predetermined value of the electrical power from the electrical power source unit is supplied to the target of supply, the power source management circuit increases a load of the electrical power source unit and controls an output electric power of the electrical power source unit to the predetermined value.

2. The electrical power control apparatus according to claim 1,
    wherein when the supply control circuit supplies the electrical power of the battery unit to the target of supply, the electric power source management circuit stops supplying the electrical power from the electric power source unit to the target of supply.

3. The electrical power control apparatus according to claim 1, wherein when the amount of charge of the battery unit is lower than the threshold, the electric power source management circuit supplies the electrical power from the electric power source unit to the battery unit.

4. The electrical power control apparatus according to claim 1, wherein
    when the electric power source unit operates in a condition of the electrical power conversion efficiency, the supply control circuit supplies the electrical power of the electric power source unit to the target of supply.

5. The electrical power control apparatus according to claim 1, wherein when the electric power source management circuit controls the electrical power supply from the electric power source unit to the target of supply in order that an electrical power conversion efficiency of the electric power source unit is equal to or higher than a set value and when the electric power source unit has a surplus of electrical power, the electric power source management circuit supplies the surplus of electric power of the electrical power source unit to the battery unit.

6. An electrical power control system comprising:
    an electrical power source unit;
    a battery unit that receives electrical power from the electric power source unit and charges the electrical power;
    a supply control circuit that controls electrical power supply from one or both of the electric power source unit and the battery unit to a target of supply; and
    a power source management circuit that controls the electrical power supply from the electric power source unit via the supply control circuit,
    wherein when an amount of charge of the battery unit is equal to or higher than a threshold, the supply control circuit supplies electrical power of the battery unit in preference to electrical power of the electric power source unit to the target of supply, and
    wherein when the amount of charge of the battery unit is lower than the threshold and a load of the target of power supply is lower than a set load when a predetermined value of the electrical power from the electrical power source unit is supplied to the target of supply, the power source management circuit increases a load of the electrical power source unit and controls an output electric power of the electrical power source unit to the predetermined value.

7. The electrical power control system according to claim 6, wherein the battery unit comprises:
a first storage battery;
a second storage battery; and
a battery control circuit that controls the first storage battery and the second storage battery,
wherein when electrical power is supplied from the first storage battery to the target of supply and an amount of charge of the first storage battery becomes equal to or lower than the threshold, the battery control circuit switches from the first storage battery to the second storage battery and supplies electrical power of the second storage battery to the target of supply.

8. The electrical power control system according to claim 7, wherein the battery control circuit controls charging the first storage battery and the second storage battery based on information input by a user.

9. An electrical power control method for controlling electrical power supply from an electrical power source unit and a battery unit to a target of supply, comprising supplying electrical power of the battery unit in preference to electrical power of the electric power source unit to the target of supply when an amount of charge of the battery unit is equal to or higher than a threshold; and controlling the electrical power supply from the electric power source unit, wherein when the amount of charge of the battery unit is lower than the threshold and a load of the target of power supply is lower than a set load when a predetermined value of the electrical power from the electrical power source unit is supplied to the target of supply, increasing a load of the electrical power source unit and controlling an output electric power of the electrical power source unit to the predetermined value.

10. The electrical power control apparatus according to claim 1, wherein when the load of the target of power supply is equal to or higher than the load when the predetermined value of the electrical power from the electrical power source unit is supplied to the target of supply, the supply control circuit supplies the electrical power of the battery unit to the target of supply.

* * * * *